United States Patent [19]
Garziera

[11] 3,972,027
[45] July 27, 1976

[54] SKEW COMPENSATION FOR A MAGNETIC CARD READING-WRITING UNIT

[75] Inventor: Gastone Garziera, Ivrea (Turin), Italy

[73] Assignee: Ing. C. Olivetti & C., S.p.A., Ivrea (Turin), Italy

[22] Filed: Dec. 6, 1974

[21] Appl. No.: 530,315

[30] Foreign Application Priority Data
Dec. 28, 1973   Italy .................................. 70878/73

[52] U.S. Cl. ...................... 340/172.5; 235/61.11 D; 360/47
[51] Int. Cl.² ..................... G06F 11/00; G11B 5/09; G06F 13/04
[58] Field of Search ................. 340/172.5, 146.1 F; 360/39, 47, 48, 51; 235/61.11 D, 61.12 M, 61.12 N

[56] References Cited
UNITED STATES PATENTS

| | | | |
|---|---|---|---|
| 2,952,008 | 9/1960 | Mitchell | 340/146.1 F |
| 3,495,222 | 2/1970 | Perotto | 340/172.5 |
| 3,636,523 | 1/1972 | DeSandre | 340/172.5 |
| 3,665,432 | 5/1972 | Kimura | 360/48 |
| 3,685,015 | 8/1972 | Bocek | 340/146.1 F |
| 3,708,783 | 1/1973 | Hedin | 340/146.1 F |
| 3,789,379 | 1/1974 | Breikss | 360/51 |
| 3,852,810 | 12/1974 | McGrath | 360/51 |

Primary Examiner—Gareth D. Shaw
Assistant Examiner—James D. Thomas
Attorney, Agent, or Firm—I. J. Schaefer

[57] ABSTRACT

In an electronic computer, a magnetic card is recorded along two tracks for storing information. The relative delay between the sequential records on the tracks is controlled by two reference bits simultaneously written on the tracks of the card. During the reading, the first sensed reference bit starts a count which is stopped upon sensing the second reference bit. All data bits following the anticipated bits are transferred to the internal memory only after a delay proportional to the count.

7 Claims, 9 Drawing Figures

SKEW COMPENSATION FOR A MAGNETIC CARD READING-WRITING UNIT

BACKGROUND OF THE INVENTION

The present invention relates to an electronic computer, of the micro-programmed type, connected to a peripheral unit for reading and writing information from and on to magnetic storage media. More particularly, the invention relates to a device for compensating errors which may occur during the reading of magnetic supports, as for example, magnetic cards.

Magnetic cards known in the art allow storage of information on one or more magnetic tracks, scanned in temporal succession during successive passages of the card by the reading/recording unit. The useful information is normally interrelated with synchronisation signals designed to permit reading of the useful information with the rhythm necessary for operating control of the card unit. With this type of recording there is the possibility that synchronisation signals may be read as useful information as a result of accidental irregular variations in the speed of advancement of the card.

In order to guarantee constant speed of advancement of the card, some known reading devices are provided with a flywheel connected to the card puller, involving however a material increase in costs and maintenance difficulties.

DESCRIPTION OF THE PRIOR ART

Other known devices adopt instead a system of recording on two parallel tracks. These tracks are recorded and read alternately. In this way, for equal card lengths and equal information contents, the density of the latter may be halved relative to the density required by a single-track card. Also, since reading of the two tracks is carried out alternately, controlled by the presence of a bit which has necessarily to be on one or other of the two tracks, it is evident that synchronisation signals are not needed. In fact the rhythm of reading is communicated to the control of the card unit by the same bit of useful information always present on one or other of the tracks. The danger of errors of reading the information in this type of recording, through instantaneous irregular variations in the speed of advancement of the card, is avoided.

With such solutions, an alphabetical or numerical character represented by a precise sequence of bits is recorded partly on one track and partly on another; i.e. the bits which in a particular sequence represent a particular alphabetical or numerical character are recorded partly on one track and partly on the other. It is essential for the accuracy of future processing that in the reading phase the order of the bits shall be the same as in the recording phase. In fact, to a different order of the bits there corresponds a different character.

This sequence may give rise to serious difficulties when the card runs with a serpentine or skewed motion along the guide in which reading takes place. There is the possibility that the two parallel tracks may present themselves under the reading head of the card unit at such an angle to the normal direction that the bits of one track may be read before bits of the other track which preceded them in the recording phase. In this way one bit may be found to be unduly advanced with respect to its position in the recording sequence, which will be called phase-displacement in what follows.

There is also known an apparatus for recording and reading the data on a magnetic disc having several parallel tracks and a fixed head, in which the phase-displacement of the tracks is corrected by dividing said phase-displacement in half. This kind of correction is not however suitable for the computer according to the invention.

SUMMARY OF THE INVENTION

It is an object of the present invention to provide an electronic computer including a central programming unit, an information memory, a reading-writing unit for a magnetic storage medium with at least one magnetized track of the type containing reference signals at regular intervals, and means for transferring information between the reading-writing unit and the memory, characterized in that the said means of transfer being controlled by means which sense the relative timing of at least two reference signals read from the track to selectively delay items of information relative to other items of information by amounts determined by said relative timing, prior to the entry of the items of information in the memory.

DESCRIPTION OF THE DRAWINGS

The invention will be described in more detail, by way of example, with reference to the accompanying drawings, wherein:

FIG. 7 is a representation of the format of each micro-instruction;

DETAILED DESCRIPTION OF THE PREFERRED EMBODIMENT

Figure 1:
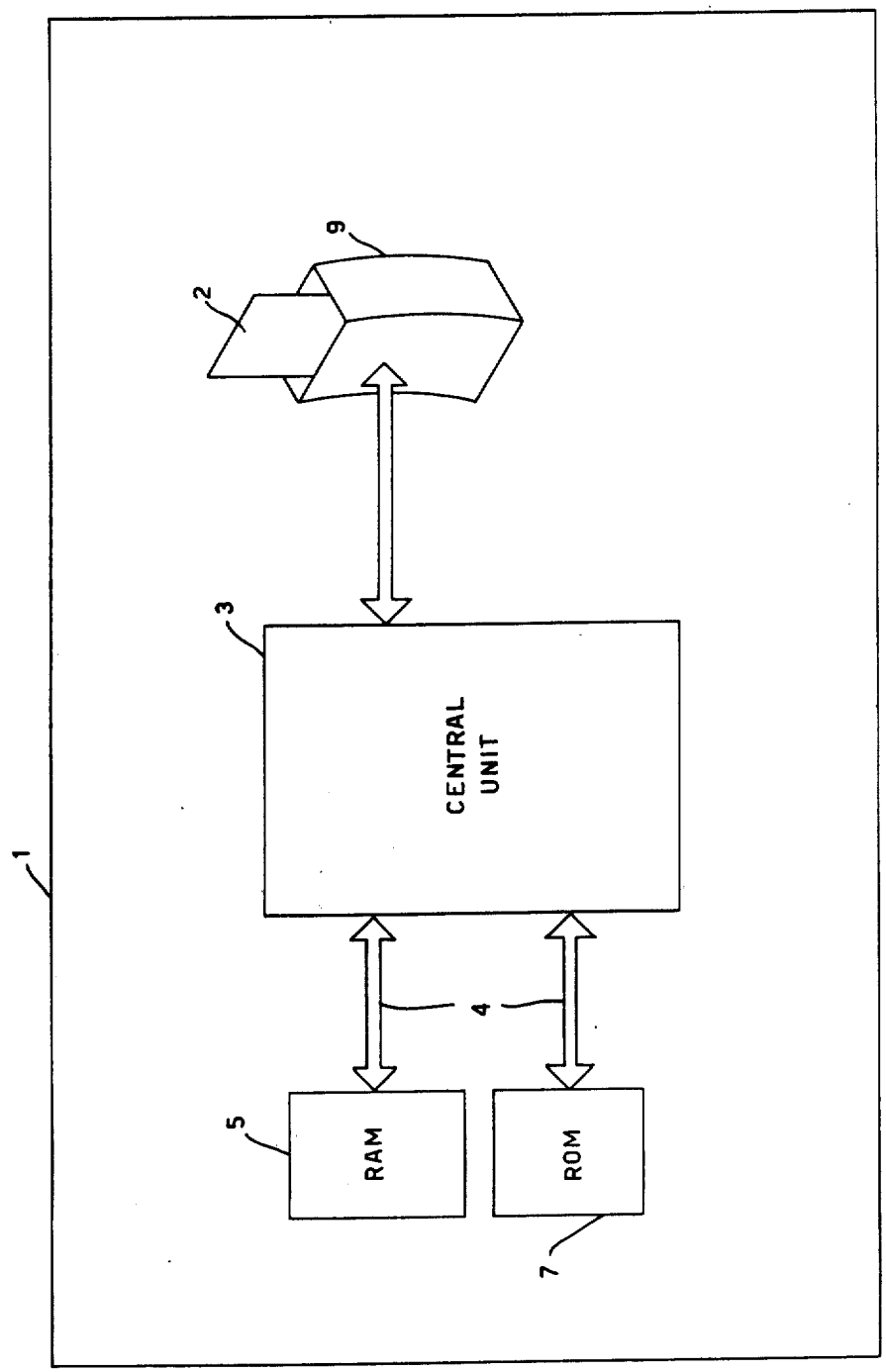
FIG. 1 is a block representation of an electronic computer with a read-write unit for a magnetic storage medium, embodying the invention.

The computer, indicated generally by 1 in FIG. 1, comprises a central unit 3 to which are connected a random access read-write memory (RAM) 5 for storing data or programme instructions organised in a series of registers of 60 bits each. The computer 1 comprises also a read-only memory (ROM) 7, containing the microprogrammes which carry out the functions commanded by the instructions of the operator, and a read-write unit 9 for magnetic cards of the type described in the specification of our U.S. patent application Ser. No. 461,559. The methods of signalling "card present" and "end of card" are identical to those described in the cited specification; a micro-switch 10 (FIG. 5) is actuated by the passage of the card 2 in a guide 12 of the unit 9 and signals to the central unit 3 the start of reading or recording. Reading or recording is then interrupted when the micro-switch 10 is de-actuated by the exit of the card from the guide.

The magnetic card unit 9 comprises a group of magnetic read-write heads 14 (FIG. 5), each having a double extension 16 (FIG. 6) which constitutes a true and exact pair of magnetic heads designed for recording or reading, on two distinct tracks, the information respectively proceeding from the memory 5 or destined to go to it.

Figure 8:
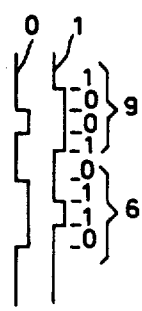
FIG. 8 is a magnetization diagram of the bits of information.

In the particular embodiment here described, the card 2 (FIG. 5) stores on one of the two tracks, which will be called track 1 (FIG. 6) the 1 bits, and on the other track which will be called track 0, the 0 bits. Recording of the information (data and/or instructions) proceeding from the memory 5 (FIG. 1) takes place on the two tracks 1 and 0 by the "non-return-to-zero" technique, and in a sequential and alternating manner; i.e. the series of the zeros and the ones which represent the information in code are recorded in the two tracks according to the positional order in which they follow each other in the code configurations of the information. For example, the numerical datum 9, represented in binary decimal code as 1001, will be recorded by a first commutation of the magnetic flux on track 1 followed by two commutations of flux on track 0, and finally by one commutation on track 1 as shown in FIG. 8, while the numerical datum 6, represented as 0110 will be recorded by a first commutation on the track 0 followed by two commutations on track 1, and another commutation on track 0.

The positional order of recording must be respected during reading. In fact, if in the above case the third commutation of flux 0 is read after the fourth commutation 1, the number read would be in effect the number 10 (in binary 1010) instead of the number 9, with serious results for future calculations which might make use of such erroneous information.

What has been said above would not happen if the card advanced in a direction constantly parallel point by point to the axis of the guide. In fact in analogous instants of time during recording and during reading the same positions of the track would be under the reading-writing head. The same situation would occur if the card were to advance in a direction not parallel but oblique with respect to the axis of the guide, provided that the path followed by any point of the card were the same during reading and during recording.

On the other hand, if it is found that there are alterations in the read information compared with the recorded information, this indicates random angular variation of the direction of advance of the card, which can oscillate in the guide 12 because of unavoidable play of the card in the guide 12. It is not only the direction of advance is not parallel to the axis of the guide 12 (FIG. 6) but the path of a given point of the card 2 is not the same during recording and during reading. In such a case there is phase-displacement of the time-order or recording between the bits read on one track and those read on the other track. In fact, if at a given instant the card 2 advances, in an oblique direction relative to the axis of the guide 12, towards the right hand edge 21, the bits of the track 0 arrive under the magnetic head, and can be read, before the bits of track 1 which preceded them in recording. Here we are in the presence of the error known as "positive phase-displacement".

On the other hand, it happens that bits of the track 1 may be read after those of track 0 which followed it in recording, if, at a given instant the card advances towards the left hand edge 23 of the guide. In this second eventuality we have the error known as "negative phase-displacement".

Let it be supposed that the card 2 is introduced into the guide 12 of the read-write unit 9 in such a way that it points in the first instants in the direction of the left hand edge 23. This will give in the first instants, as already stated, a "negative phase-displacement" error. Soon afterwards however the card 2 is subject to the couple created by the force due to a centrally operated pulling belt 24, and by the rubbing force of a pressure roller 28 acting laterally on the card 2 in correspondence with the head 14, which is directed in the opposite sense to the first force and is smaller than the first force. This couple tends to turn the card 2 permanently in movement so as to bring it towards the right hand edge 21, thus giving rise to the error known as "positive phase-displacement".

An associated case of errors in reading the information on the magnetic card 2 is imperfect alignment of the two read-write heads 16 due to imperfect fitting of the head itself, either during the original construction of the magnetic card unit 9, or in the course of subsequent maintenance.

An additional cause of errors arises either for cards recorded and read on the same machine or for those recorded on one machine and read on another. In the latter case, the possible differences of alignment between the two heads 16 of the first machine and the two heads of the second machine create a certain incompatibility between machines of the same type. For cards recorded on the same machine on which they are read, an error may arise if reading occurs after a maintenance interval on the magnetic card unit, which inevitably leads to alteration of the play between the parts and of the controls, or from the occurrence of thermal expansion following temperature changes.

Since the density of recording is a datum fixed by the need to avoid making the card too long and cumbersome, both on account of the space and the machine-time occupied by it, and since the tolerances in question are real and cannot be eliminated except at a very high cost, the need is felt for a device capable of avoiding the inconveniences arising from the above-mentioned causes.

The principle on which the error compensation is based in the computer embodying the invention, consists essentially in measuring the time advance with which one track is read compared with the other and in delaying the bits of this track by a time equal to the said time-advance before sending them to the computer memory. For this purpose the phase-displacement (delay) is kept constant between one measurement and the next, while the measurements are made with sufficient frequency to avoid the introduction of a phase-displacement of opposite sign. The actual frequency of these measurements is every 120 bits of memory, equal to two memory registers.

The card 2 may be recorded on two faces. The card 2 can take on the two tracks 0 and 1 of each face up to 3600 bits of information, divided into 60 memory registers: i.e. on the two faces the total content of the card 2 is 120 registers. Transfer from the memory 5 to the card 2 takes place in groups of 20 registers at a time; it is possible, with suitable instructions, to prescribe the transfer of one, of two, or of three groups of 20 registers, each in sequence. To these 3600 bits are added 240 bits (4 for every 60 of information) which have the function of reference signals at regular intervals, that is as a cyclic control code, which will be seen better in what follows.

The recording of the 3840 bits on one face takes place in a time equal to the length of the card 2, divided by the speed of pulling the card, and is of the order of one second. This is the time available to the central unit for operating the transfer of the 3840 bits, leaving out of consideration the chance that the pulling speed may vary, as in fact does happen.

The time separating two bits is about 270 $\mu$sec. In terms of path length, this corresponds to a distance between two bits of about 50$\mu$, so that the density of magnetization is about 20 bits per mm.

Since the distance between the two tracks 0 and 1 of the card 2 is 5 mm and the path interval running below the magnetic heads 16 between two successive recordings is about 50$\mu$, the maximum angle between the axis of the card 2 and the axis of the guide 12 (FIG. 6), from instant to instant, beyond which a phase-displacement error occurs in reading, amounts to about 35'. The card 2 need therefore only deviate in its movement by a little more than half a degree from the correct direction, for it to generate the phase-displacement error.

As mentioned earlier, the information on the card 2 is organised in registers. Each register 30 (FIG. 9) is composed of a group of 15 characters, each composed of groups of four equidistant bits.

At the end of each register 30 there are placed four bits 32 which serve to ensure control of parity according to the known method of a cyclic control code. The first and third registers are preceded by an interval in which are recorded two reference bits 33 on the two tracks of the card 2, one for each track. The subdividing of the tracks of the card 2, according to the above scheme, occurs by the operation of a microprogramme memorised in the memory 7 of FIG. 1, in an essentially known manner. Recording of the two corresponding bits 33 takes place simultaneously.

The two bits may show up in the reading phase of the card, under the magnetic heads 16 with an effective play produced by the phase-displacement. If it is assumed that in the space between a first and a second pair of bits 33 the card runs under the heads 16 with the same phase-displacement, it is permissible to assume that all of the pairs of bits included in the said space are affected by the same phase-displacement as that affecting the bits 33.

Such an assumption is perfectly tenable for the normal angles of phase-displacement at which a card is read. In fact the space between two successive pairs of bits 33, comprises two registers totalling 120 bits, besides the two sets of four register parity control bits 32. In order to have a detectable variation of the phase-displacement in this space, in case the phase-displacement should be progressive over the whole length of the card, the resulting total angular variation between the intial and final positions of the card would have to be at least 30 × 35', or about 20°, and hence a magnitude impossible to reach. It is therefore permissible to measure the delay once for every two registers, and to assume that it remains constant for each group of registers.

Figure 2:
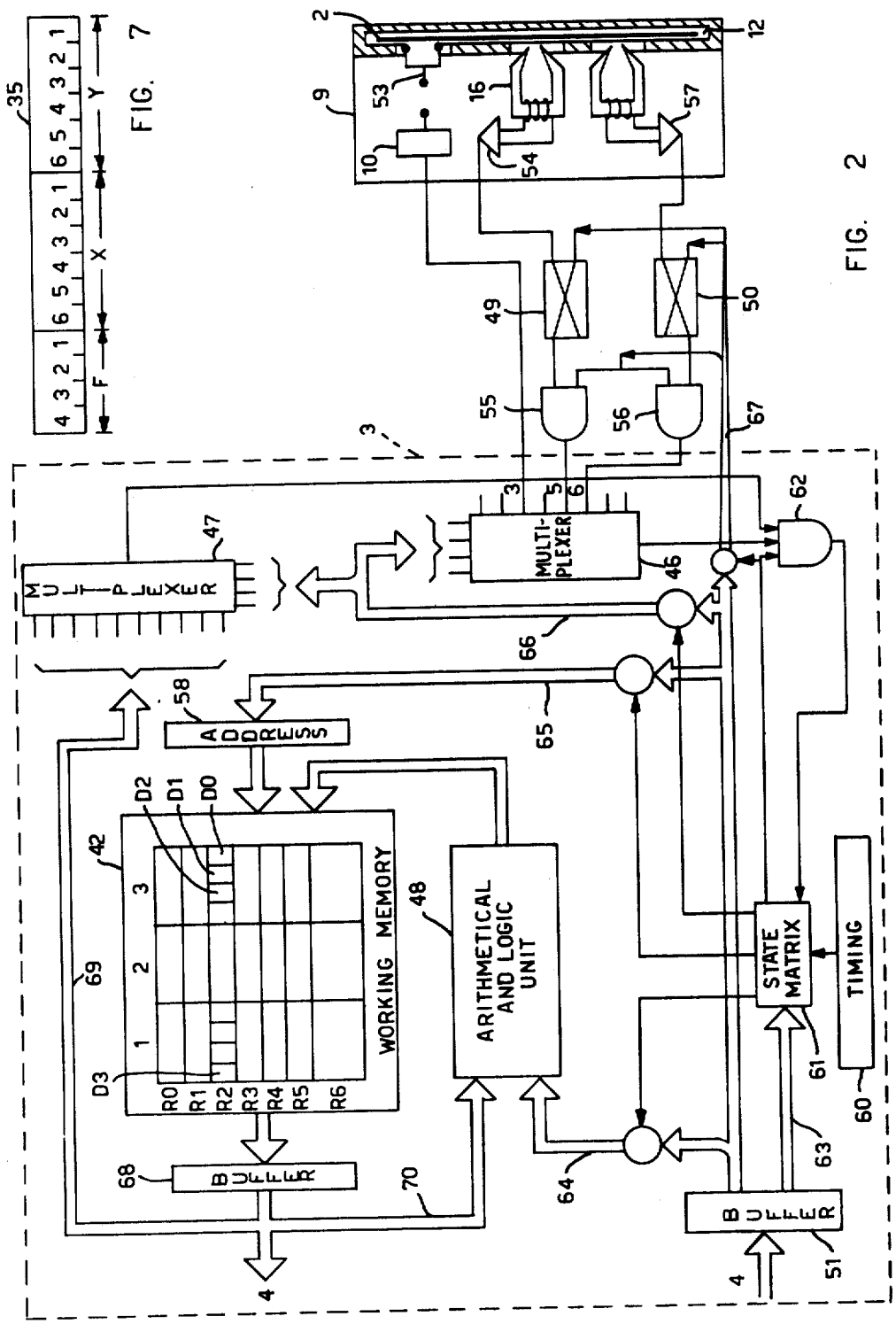
FIG. 2 is a representation of the central unit of the computer of FIG. 1.

Each micro-instruction 35 (FIG. 7) contained in the ROM 7 (FIG. 1) is composed of 16 bits structured in three fields as follows: F, (FIG. 7) a function code of four bits, X, a first operating address of six bits in a working memory 42 (FIG. 2) contained in the central unit 3, and Y, a second operating address in the memory 42 of six bits. These micro-instructions therefore address the memory 42, which is composed of seven parallel registers of 12 bits: R0, R1 . . . R6 (FIG. 2). Each of these is composed in its turn of three registers, each of four bits in parallel, for example R0 is composed of RO1, RO2, RO3. Each register of 12 bits and four bits is addressable separately by means of an address selection network 58 known in itself.

In particular the register R2 is used for memorising conditions established during the preceding calculation (for example binary carry-over). The register RO has the function of containing the current address of the memory 7, i.e. of the next micro-instruction to be carried out, and is increased by 1 at each micro-instruction read by the memory 7 (except when there is a jump). This is done with the aid of an arithmetical and logical unit 48 also included in the central unit 3. The unit 48 can operate on 12 bits in parallel just for updating the addresses of the memory 7, or else on four bits in parallel to perform additions of four bit data.

While the output of the unit 48 is always sent to a register of the memory 42, the input of unit 48 is composed both of contents of registers of the memory 42 and of a field X or Y composing the micro-instructions themselves. In this latter case the field X or Y does not represent the address to be operated in the memory 42, but an effective datum for adding to or subtracting from a register of the memory indicated by the field Y or X respectively.

In some micro-instructions for commanding a jump the operand in unique and constituted by the two fields X and Y which define the address of the memory 7 to which the jump is to be made.

Other micro-instructions, as will be seen more easily in what follows, address instead one or other of two multiplexers 46 and 47 with only four of the 6 bits of the field X. To the addressed multiplexers 46, 47 there join, from the magnetic card unit 9, the external condition signals 3, 5, 6 which influence the development of further operations.

The register R2 comprises four binary positions D0 to D3 which will be called flags in what follows, and which memorise four conditions which arise during the operations. In particular D0 serves to recognise which of the two tracks is in advance, D1 serves to recognise the occurrence of binary carryover which has already been mentioned, D2 serves to recognise that the result of a subtraction is zero, and D3 serves to recognise that the fourth position of a four-bit register is occupied.

We shall now describe the micro-instructions, with the respective formats, used in effects the error compensation.

INR/X/Y : increases the register of the memory 42 indicated by the effecting X, by the quantity Y.

TRR/X/Y : transfers the register of the memory 42 indicated by the field X into the register of the same memory indicated by Y.

SAE/X/Y : analyses an external condition of the multiplexer 46, selected by the bits X3 — X6 of the field X (FIG. 7) and, if the condition is confirmed, the micro-instruction sends into the register RO the field Y plus the bits X1, X2 of the field X, in order to use them as an address for jumping to the desired micro-instruction for responding to the external condition.

ADI/X/Y : adds the register of four bits indicated by X to the operand contained in the field Y. In a first phase the four bit register of the memory 42 indicated by X is addressed and transferred to the arithmetic/logical unit 48. In a second phase there is carried out the transfer to the unit 48 also of the second operand namely the datum contained in the field Y of the same micro-instruction. After the addition has been made, the result is returned to the memory 42 at the previous address X, in which meantime a zeroing command has been carried out. The flag D1 is possibly set to 1.

ADD/X/YI: adds the 4 bit register indicated by X to the 4 bit register indicated by Y. In a first phase there is effected the addressing of the four-bit register indicated by X and its transfer to the unit 48. In a second phase the same operations are repeated for the register indicated by Y in the memory 42. The result is placed in the memory 42 at the address of the register indicated by X, which has been zeroed in the meantime. Setting of the flag D3 may then take place.

DER/X/Y : subtracts the complement to 16 of the contents of field Y in the register X indicated. In a first phase the register indicated in the field X is addressed and sent to the unit 48. In a second phase the content of the field Y is added in the register indicated by X and there is further added 4080, i.e. all the ones in the most significant eight bits. After this the result is written in the previous address of the register indicated by X. Setting of the flag D2 may also then take place.

SAD/X/Y : transfers the register R2 to the multiplexer 47, where a particular flag is tested with the bits X3—X6 of the field X, and, if found equal to 1, an address formed from the field Y and from the bits X1 and X2 is sent to the register R0.

SAN/X/Y : transfers the register R2 or R3 to the multiplexer 47 where a particular flag D0—D3 is tested with the bits X3—X6 of the field X and if found equal to 0 an address formed from the field Y and the bits X1 and X2 is sent to the register R0.

COM/X/Y : sends a command indicated by the field X and a command indicated by the field Y to two flip-flops 49 and 50.

ORI/X/Y : produces the function OR from the register indicated and the field Y, of whose six bits only one is placed on a microprogramming basis equal to 1; the selected register modified by the OR effected in the unit 48 is subsequently written back in the memory 42.

The central unit 3 also comprises a timing unit 60 which controls a logical matrix 61 controlling the sequence of the machine states in known manner. The matrix 61 is connected to an AND circuit 62, which together with the output of the multiplexer 46 or the multiplexer 47 influences the evolution of the sequence controlled by the matrix 61, i.e. by indicating that a tested condition exists.

The matrix 61 also, as a function of the operative code of the micro-instructions which it receives from the buffer 51 through a channel 63, is designed to enable selectively four channels 64–67. The channel 64 is connected to the arithmetical and logical unit 48, the channel 65 is connected to the address selection network 58 for the memory 42, the channel 66 is connected to the two multiplexers 46, 47 and the channel 67 is connected to AND circuits 55 and 56 and to the flip-flops 49, 50. Finally, a buffer 68 for reading the memory 42 is connected through a channel 69 to the multiplexer 47 for transferring the content of the register selected in the memory 42 to the multiplexer 47. This, as a function of selection of the input made by the micro-instruction proceeding from the buffer 51, and the content of the selected register, controls through its output the AND circuit 62.

In addition, the buffer 68 is connected through another channel 70 to the unit 48, which can therefore send, to the selected registers of the memory 42, data originating from the same memory 42 and/or from the buffer 51.

The manner of operation of the central unit 3 and in particular the execution of the micro-instructions are described in more detail in our U.S. patent application Ser. No. 459,159.

The multiplexer 46 has eight signal inputs and four selection inputs connected to the channel 66. Selection of the input to be tested is effected with one of the possible configurations of four bits sent on the four selection inputs.

Referring now to FIG. 2, imagine that the machine operator, with suitable keyboard instructions, prearranges the machine for receiving information from the magnetic card unit 9. This prearrangement consists in causing the buffer 51 to send a signal "SECA" to enable the card unit 9, to zeroize the registers to the memory 42, and the repeated execution of a micro-instruction "SAE" which through the channel 66 carries out a test of the multiplexer 46 until the test gives a positive result. The micro-instruction "SAE" to test the input, for example, 3 of the multiplexer 46, must send on the four selection inputs the configuration of bits 0011.

Figure 5:
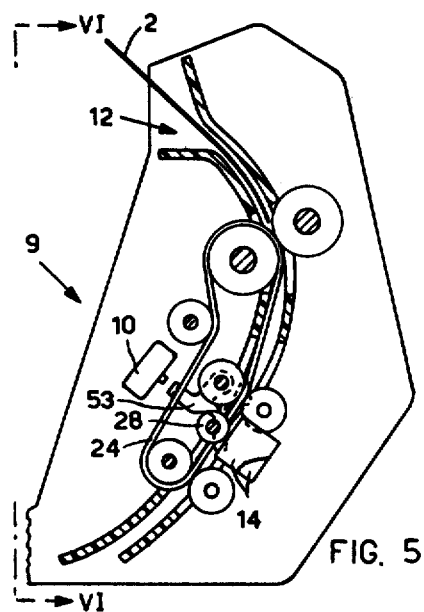
FIG. 5 is a lateral section of a guide device of a magnetic storage medium used in the computer of FIG. 1.
Figure 6:
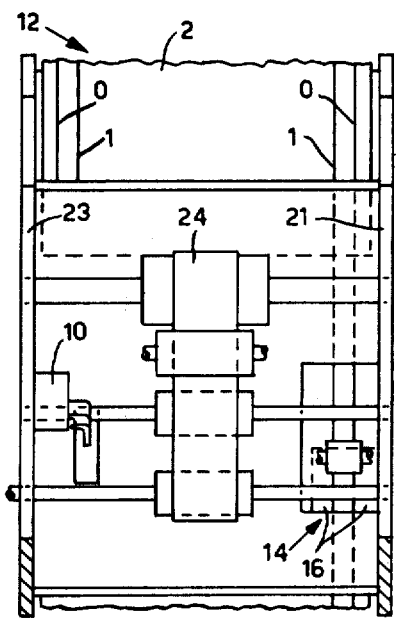
FIG. 6 is a section on the line VI—VI of FIG. 5.

When the operator inserts the magnetic card 2, FIG. 5, into the card reader 9, the micro-switch 10 (FIG. 5) is actuated by an armature 53 which rises on passage of the card 2. The actuation of the microswitch 10 generates an impulse signal which goes to the input 3 of the multiplexer 46. The micro-instruction "SAE" finding the input 3 excited (signalled via the AND circuit 62), goes on to carry out a jump into the memory 42 to the address of a Delay Measure routine (FIG. 3) which will control the measurement of the delay between the reading of the two reference signals 33 (FIG. 9) of the two tracks 0 and 1 of the card 2.

The card 2 advances in the reader 9 (FIG. 2) whose reading heads are positioned in correspondence with the two tracks 0 and 1. The first bits of the card which show up under the heads 16 are the bits 33. Assume that these bits do not show up simultaneously under the two heads, but display a certain delay. One of the two heads 16 will therefore be excited before the other, for example that for reading track 1 will be excited first. This head is connected to the input 5 of the multiplexer 46 through an amplifier 54, the flip-flop 49, and the AND circuit 55. The flip-flop 49 serves to keep "high" the potential of the input 5 of the multiplexer 46 for a time longer than the duration of the reference impulse 33.

Figure 3:
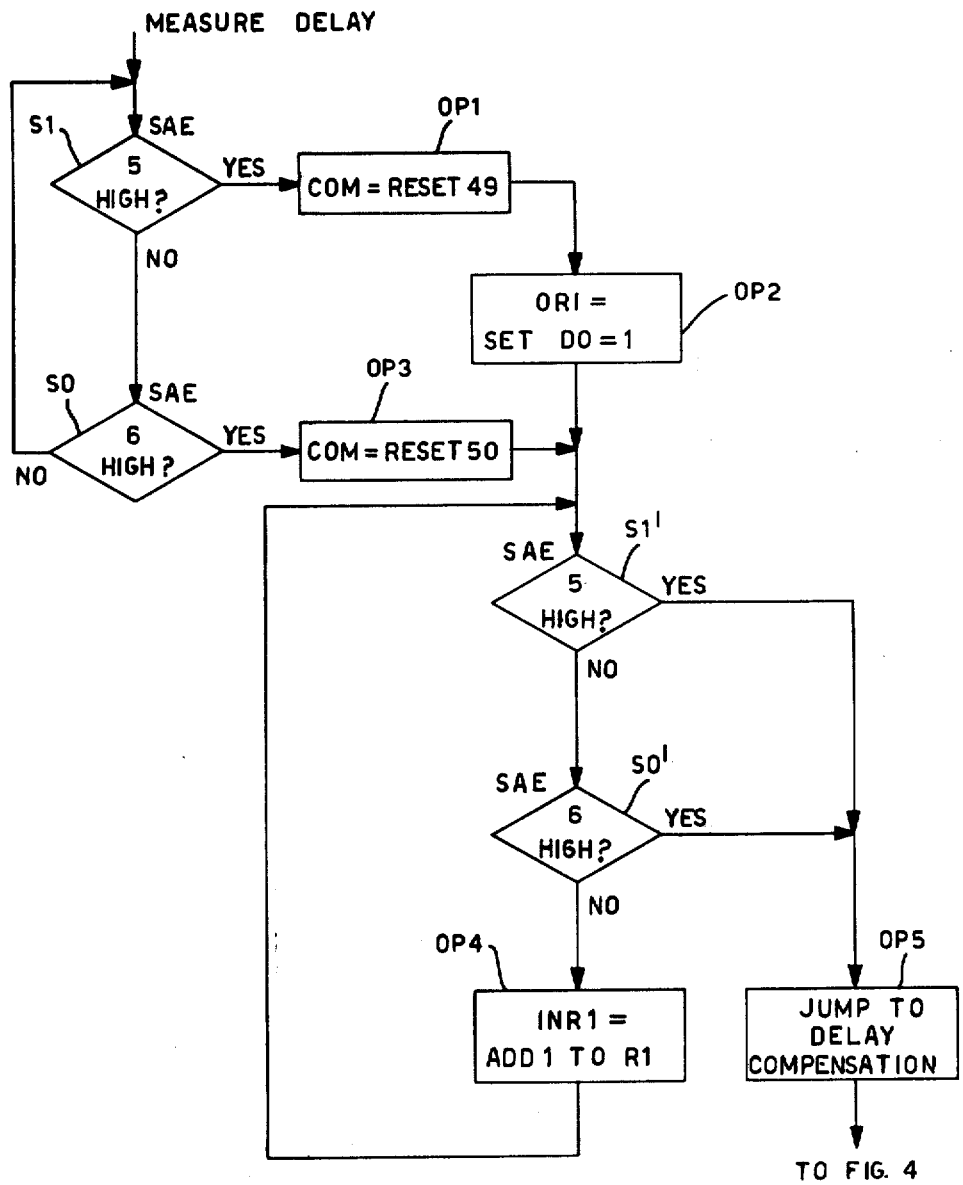
FIG. 3 is a flow diagram of a first micro-programme.
Figure 9:
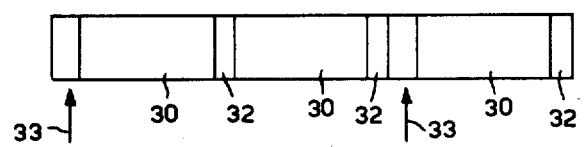
FIG. 9 is a representation of the manner in which informations are organised on the magnetic support.

When the input 5 is tested by another testing micro-instruction and found to be "high" (test S1 in FIG. 3) the flip-flop 49 (FIG. 2) is reset to operate on a command ECR sent by the relevant micro-instruction "COM" (operation OP1 in FIG. 3). This always happens before a following bit can show itself below the head 16 of the track 1 (FIG. 2), since the tests cycle requires a time of a few micro-seconds as compared with the hundreds of microseconds shown as the interval occupied by each signal 33 (FIG. 9).

After this a bit 1 is loaded into the flag D0 (OP2 in FIG. 3) of the register R2 of the memory 42, in order to memorise the fact that the track found to be in advance is track 1. This is done by the micro-instruction "ORI", whose field Y contains the first bit equal to 1. If the track in advance had been the track 0 instead, tested at the input 6 of the multiplexer 46 through an amplifier 57, the flip-flop 50 and the AND circuit 56 (SO in FIG. 3), a micro-instruction would carry out in a similar manner the reset of the flip-flop 50 (OP3 in FIG. 3), but no bit of the register R2 would be changed, the content of the flag D0 thus remaining zero. A later test, as we shall see, will utilise the content of the flag D0 to show whether the track in advance is track 1 or track 0.

The bit of the advanced track 1 is now read with a certain delay, during which there follow two tests of the input 5 and input 6 respectively in order to provide for the two possibilities of track 1 in advance or track 0 in advance (S1' and SO' in FIG. 3). Of these tests only one will give a positive result, SO' of track 0 if the first bit to arrive were from track 1, and S1' in the opposite case.

For each negative test on the two tracks of the card 2 a micro-instruction. "INRI" is carried out which increases by 1 the register R1 of the memory 42 (OP4 in FIG. 3). As soon as the test of the delayed track gives a positive result, the cycle of testing/increasing finishes and the register R1 holds the number of time-cycle units by which one track is advanced with respect to the other. For example, if the time required for the two tests and for increasing the register R1 is 6μ secs a total count of 100 in the register R1 represents a delay of 600 μsec between one track and the other. This measurement remains valid, as already stated, for the content of two registers, i.e. 120 bits, plus 8 parity bits.

Figure 4:
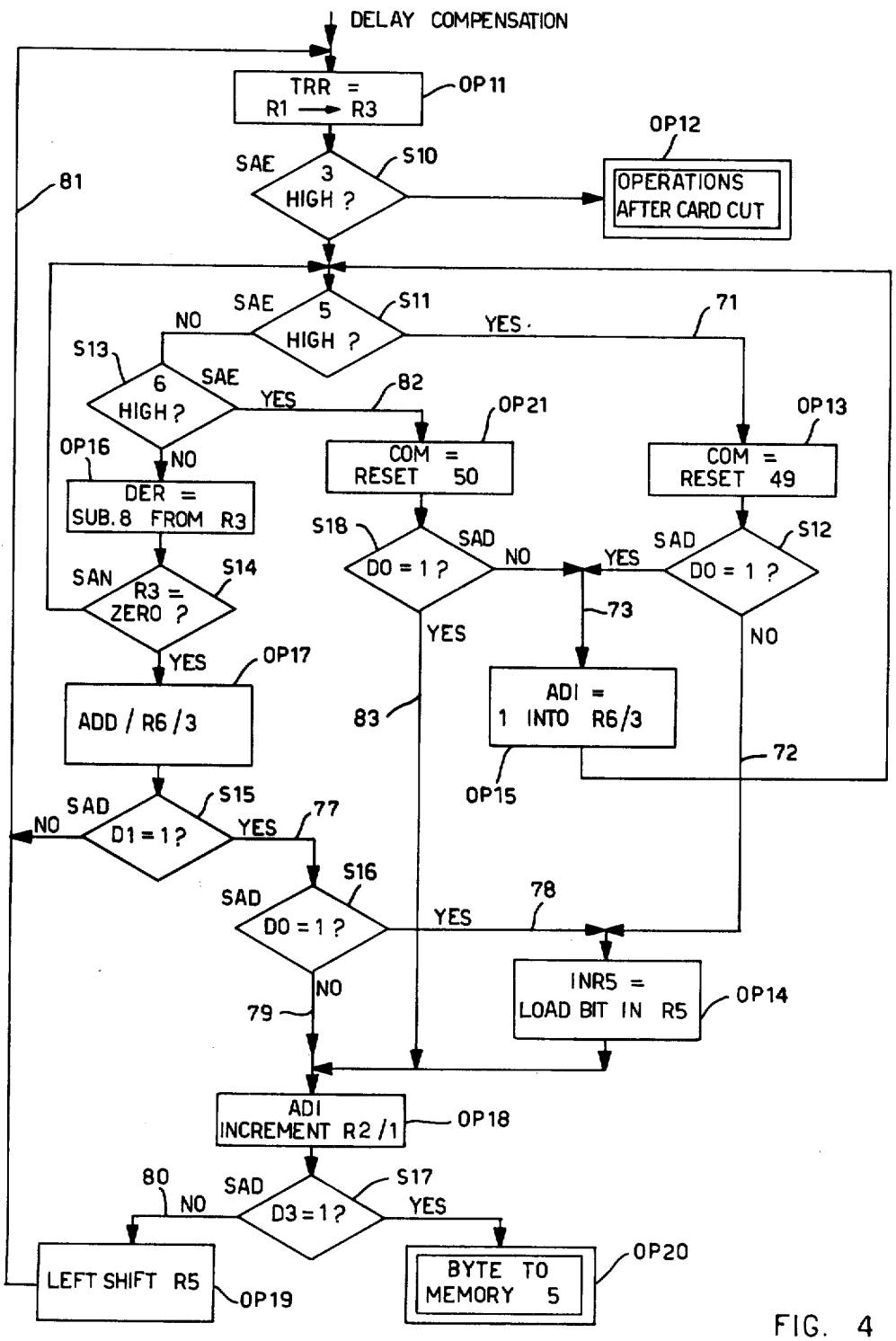
FIG. 4 is a flow diagram of a micro-programme of the computer.

The end of the test/increase cycle induces a jump to the "Delay Compensation" routine (OP5 in FIG. 3) which is illustrated in FIG. 4. This routine has for its aim the rearranging into the original byte to which they belonged, the bits of the two tracks 0 and 1 of the card 2 which show up during reading in phase-displacement succession with respect to that when they were recorded. This routine uses the content of the register R1 to delay the bits of the advanced track by a time equal to that represented by the same register.

The first micro-instruction of the routine "Delay Compensation" is a "TRR" which transfers the content of the count register R1 nondestructively into the register R3 of the memory 42 (operation OP11 in FIG. 4), this register being used as a count-down register. This transfer is operated because the number in the count register R1 must be counted down (in R3) four times for each bit (as will be seen below) and, whenever it reaches zero, it must be re-established.

The micro-instruction which follows is an "SAE" for testing the input 3 (FIG. 2) of the multiplexer 46, connected to the micro-switch 10 (test S10 in FIG. 4). The object of this test is to reveal the output of the card 2 by the card reader 9. In this case lowering the armature 53 (FIG. 7) induces a second impulse signal in the micro-switch 10. The operations which follow detection of the output of a card constitute a routine indicated by OP12 in FIG. 4.

The succeeding micro-instruction which takes control of the central unit is another "SAE" which tests the input 5 of the multiplexer 46 (test S11 in FIG. 4) for showing the arrival of one bit of information, on track 1, i.e. a bit 1. If the test gives a positive result (see 71 in FIG. 4) a micro-instruction "COM" sends the command Reset ECR to the flip-flop 49 (OP13 in FIG. 4).

A micro-instruction "SAD" now tests the flag D0 of the register R2 of the memory 42 (S12 in FIG. 4). The content of this flag indicates, as already stated, which track is in advance. If the flag D0 contains a bit 0, the bit of track 1 of the card 2 (see path 72, FIG. 4) is immediately loaded into the register R5, whose content is later transferred into memory 5 (FIG. 1). This means that a micro-instruction INR5 is obeyed which leads to the entry of a bit 1 into the register R5 (OP14 in FIG. 4).

If, on the other hand, the flag D0 (FIG. 2) contains a bit 1, thus indicating that the first reference bit shown up belonged to track 1 of the card 2, the procedure must be to delay the bit sensed at S11 by a time equal to that by which the track 1 is in advance of track 0 (see path 73 in FIG. 4). This time is initially contained both in the register R1 and in the register R3 following performance of the micro-instruction "TRR". A micro-instruction "ADI" proceeds now, by incrementing the register R6/3 to accept the loading of this bit 1 in the first position of the latter register (OP15 in FIG. 4). The bit 1, loaded into the register R6/3 is now displaced by one register position at each count-down cycle composed of the following steps: one test of track 1 (S11), one test of track 0 (S13), decreasing the register R3 (OP16) and an operation of analysis of the zeroing of the register R3 (S14). This cycle is repeated four times to effect complete shifting of the four bit register R6/3 making the output of the last position the bit which started from the first position. During these four cycles the total delay between the track 0 and the contents of the registers R1 or R3 must be exhausted.

It has been seen that the count cycle, that is the time required for running through the sequence S1', SO', OP4 (FIG. 3) is about 6 μsec. The count-down cycle, that is the time required for running through the sequence S11, S13, OP16, S14 (FIG. 4) is not in general equal to the count cycle. It is assumed that the count-down cycle takes about 12 μsec, during which if one bit at a time is counted down from the register R3 it would involve a time twice as long as that involved for the count.

The number in the register R1 represents the delay time between the two tracks and is formed by incrementing R1 by 1 with each increment representing 6 μsec delay. The criteria by which the number R1 is utilised to delay the bit that is first sensed are as follows:

1. during the time that is represented by the said number, the bit first sensed must step through four bit positions of the register R6/3 (cycle OP11, S10, S11, S13, OP16, S14, OP17, S15). This cycle is repeated four times.

2. the number itself is decremented to cause, when zeroized, the single advancing step of the bit first arrived (subcycle S11, S13, OP16, S14).

Therefore the number in register R1 representing delay time must be transferred four times to the register R3 where it will be decremented a variable number of times depending upon the number, that is, depending upon the delay.

It is necessary that the total counting down time, which is equal to the delay time in which the four shifts of the register R6/3 occur, should be equal to the total count time. Since a count-down cycle is twice as long as a count cycle and since the number representing the delay is counted down four times, the number which has to be subtracted in each count-down cycle is 2 × 4 = 8. In this way, the four shifts in the register R6/3 takes place in the time equal to the desired delay.

The number 8 is thus repeatedly subtracted from the register R3 and when this register reaches zero, it will be reloaded and the subcycle restarts.

Let us assume that the delay is 600 μsec, whereby the count reaches the value of 100 in the register R1. This number must be zeroized in the register R3 by 13 decrements of 8, then reloaded from register R1 while the bit in register R6/3 is advanced by one step. At the end of four such cycles the stepped bit is sensed in output of register R6/3. The switch D1 is then set and the delay operation ends with the bit being delayed by substantially the same time as it was read in advance, actually by $4 \times 13 \times 12 = 624$ μsec.

The tests S11 and S13 which make up the cycle have already been described. The decrementing of the register R3 is effected by operation of the micro-instruction "DER" (operation OP16 in FIG. 4). The content of the field Y (minuend or operand to be subtracted from the register R3) is therefore 8.

At the end of the cycle of decreases in which the zeroing condition of the register R3 takes place, which is memorised in the flag D2 and is tested by a micro-instruction "SAN" (test S14 in FIG. 4) the staggering of the bit 1 by one position in the register R6/3 is effected by the micro-instruction ADD/R6/3 (OP17 in FIG. 4). With the binary summation of a register of four bits, there is obtained automatically, as already noted, a shift to the left of the bit 1 contained in the register.

The bit 1 which was before summation in a given position in the register, is after summation in the next position. The fourth shift operation causes setting of the flag D1, which thus memorises the attainment of overfilled capacity of the register R6/3. This means that the bit of the advanced track undergone in traversing the register R6/3 a delay equal to the advance by which it had been affected.

The flag D1 is tested by a micro-instruction "SAD" (S15 in FIG. 4) and when it is not equal to 1 makes the sequence start off again for another shift starting with the operation OP11, whereas when D0 = 1 it induces continuance of the sequence along the path 77 of the flow diagram.

The next micro-instruction to be carried out is a micro-instruction "SAD" which tests the flag of the advanced track (test S16 in FIG. 4 which is physically equal to the test S12). If the flag D0 is found to be set, entry of the bit 1 into the register R5 takes place following the micro-instruction INR5 (OP14 in FIG. 4 according to the flow path 78). If, on the other hand, the flag D0 is not set, i.e. the advanced track is the track 0, no increment is made to the register R5. In this case there is direct passage (path 79 in FIG. 4) to the micro-instruction of the next incrementation "ADI" of 1 of the register R2/1 (OP18) to signal arrival of a bit which will form the byte read on the card 2.

When the register R2/1 has been incremented 8 times, the byte is complete. This condition is analysed by testing the flag D3 with the micro-instruction "SAD" (test S17 in FIG. 4), D3 = 1 indicating formation of the byte of 8 bits in the register R5. Until the byte has been completed, a shift to the left of the contents of the register R5 is carried out (path 80).

This shift is effected by the summation micro-instruction ADD of the register R5/2 on itself, the summation micro-instruction "ADD" of the register R5/3 on itself and the "SAD" test of the flag D1 to recognise any binary carryover from the register R5/3 (routine OP19 in FIG. 4).

If the test should give a positive result it is necessary to ensure that the binary carryover is transferred to the first position of the register R5/2 with a summation micro-instruction "ADI" of one 1 bit to this register. Finally there is a return, after this shift, to the start of the sequence (path 81) to repeat the whole procedure on another bit. As soon as the byte has been completed it is transferred to the memory 5 (FIG. 1) using a known routine (OP20 in FIG. 4).

For completeness there is also shown the possibility indicated by the path 82 of the flow diagram, i.e. the case in which a bit 0 arrives on the multiplexer 46. The bit 0 must then be transferred as such to the register R5 and then to the memory 5. Therefore after having sent the command ECS (FIG. 2) to the flip-flop 50 with the micro-instruction "COM" (OP21 in FIG. 4) and after testing the flag D0 with a micro-instruction. "SAD" (S18 in FIG. 4) to get a positive result, i.e., that track 1 in advance, there takes place direct incrementation (path 83) of the computer register R2/1 of 8 control bits for formation of the byte (OP18).

After a test of the flag D3 giving a negative result with a micro-instruction "SAD" to recognise whether there has been formation of the byte of 8 bits (S17), shift by one position of the register R5/3 and R5/2 is carried out, and then zeroing, by binary summation, of the first position of the register R5/3 which thus carries automatically a bit 0 in the byte to load into the memory 5 (FIG. 1).

It does not matter that the bit 0 may have to be dealt with while a bit 1 is still being delayed. When the bit 0 has been recorded via paths 82 and 83 and S13 goes back to "NO" the counting down to delay the bit 1 re-commences.

The bit 0 is considered otherwise when testing of the flag D0 (S18 in FIG. 4) carried out with a micro-instruction "SAD" gives a negative result. This means that track 0 was the one which was anticipated and that bit 0 which has now arrived, must undergo a delay equal to the anticipation (see path 73). The bit 0 is therefore regarded as a bit 1 in order to be able to undergo the same treatment as has already been described in respect of bit 1 of track 1. At the end of the cycle, however, in relation to the testing of the flag D1 (S15 in FIG. 4), another testing of the flag D0 (S16 in FIG. 4) is carried out by a micro-instruction "SAD"; naturally, another negative result is obtained. Consequently, the bit which emerges from the delay cycle (OP11, S10, S11, S13, OP16, S14, OP17, S15) is recognised as a bit 0. The successive action represented by block OP18 on FIG. 4 is carried out by means of an "ADI" micro-instruction. This micro-instruction adding 1 to the register R2/1 takes account of the fact that a further bit will go to form the 8 bit byte in register R5.

The micro-instruction "SAD" now causes testing of the flag D3 (testing S17) which, when a positive result is obtained, indicates completion of the byte as in the case of the anticipation of track 1.

As is seen from the above remarks, it is obvious that the means included in register R1 are sensitive to the reference signals 33 corresponding to the two tracks 0 and 1 of the card and control the means of transfer (46, 42, 68) of the information between the reading/writing unit 9 and the memory 5 so as to effect a transfer of the information of the various tracks in an ordered manner. In particular, the registers R5/3 and R5/2 are fed with the bits of a byte, with a delay calculated by repeated counting down of the register R3 into which the delay stored in the register R1 is loaded each time.

It is obvious that the same reading correction can be made by acting on other parameters or with different means, without departing from the scope of the invention as claimed. Correction may also concern not only the reading of two or more tracks in parallel but also the reading of a track in which the characters must succeed one another at rhythmical intervals. In such a case, the comparison may be controlled by a timer and based on the reading of the successive reference signals.

What I claim is:

1. In an electronic computer: a central processing unit; an information storing memory; a reading-writing unit for reading from and writing information on a magnetic card in form of bits distributed along a pair of magnetized tracks and including means for simultaneously writing one reference signal of a pair of reference signals on each of said tracks; means for transferring the formation between the reading-writing unit and the memory; and delay compensation means responsive to the reading of said pair of reference signals to control the means for transferring to compensate for any introduced delay to transfer said information to said memory in the order it was written.

2. A computer according to claim 1, wherein said delay compensation means include means for measuring any delay time between which the two reference signals of each pair are read.

3. A computer according to claim 2, wherein said delay compensation means further includes a first register for storing in digital form a number representing the measured delay time and control means for effecting said means for transferring to delay the information read from the track associated with the first sensed reference signal by an amount of time represented by said number.

4. A computer according to claim 3, wherein said means for writing includes means for writing a plurality of said pairs of reference signals at predetermined intervals, and said control means includes a second register loadable at constant time intervals with the number of said first register and wherein said delay compensation means includes a logic circuit for effecting the counting down of the second register for each bit included between two pairs of reference signals and delaying of each bit read from the track for which the reference signal is read in advance until the counting down zeroizes the second register.

5.. A computer according to claim 4, wherein the logic circuit comprises a third register, means for entering a bit in a lower order stage thereof, means for repeatedly decrementing the contents of the second register by a predetermined count-down number, means operative when the second register has been completely counted down to reload it with the number from the first register and to effect a shift of the bit in the third register, and means responsive to a carry over from a higher order stage of the third register to terminate the counting down and effect the transfer of the bit read from the track for which the reference signal is read in advance.

6. A computer according to claim 5, wherein said delay compensation means further includes counting means for incrementing the number in the first register for each count cycle of a predetermined duration occurring between the reading of each pair of the reference signals of the two tracks, said predetermined count-down number being a multiple of the number with which the first register is incremented in each count cycle, the multiple being in accordance with the number of shifts which the bit undergoes in the third register before the counting down is terminated.

7. A computer according to claim 6, wherein said delay compensation means further comprises a logic count circuit connected to said first register and having a count cycle of a duration different from said count cycle of the logic count-down circuit, said predetermined count-down number being calculated to take into account the different duration.

* * * * *

UNITED STATES PATENT OFFICE
CERTIFICATE OF CORRECTION

PATENT NO. : 3,972,027
DATED : July 27, 1976
INVENTOR(S) : Gastone Garziera

It is certified that error appears in the above-identified patent and that said Letters Patent are hereby corrected as shown below:

Column 13, line 19 delete "formation" and insert --information--.

Signed and Sealed this

Fourth Day of January 1977

[SEAL]

Attest:

RUTH C. MASON
*Attesting Officer*

C. MARSHALL DANN
*Commissioner of Patents and Trademarks*